United States Patent [19]

Wood

[11] Patent Number: 4,491,388
[45] Date of Patent: Jan. 1, 1985

[54] SUPPORT CARRIAGE FOR A SOLAR CONCENTRATOR

[76] Inventor: Douglas E. Wood, P.O. Box 32, Fox Island, Wash. 98333

[21] Appl. No.: 382,918

[22] Filed: May 28, 1982

[51] Int. Cl.³ .......................... G02B 5/10; G02B 7/18
[52] U.S. Cl. .................................. 350/636; 248/123.1; 248/183; 126/425; 126/438; 343/765
[58] Field of Search ............... 350/292, 289, 288, 268; 353/3; 126/425, 438; 248/469, 123.1, 183; 343/765, 766

[56] References Cited

U.S. PATENT DOCUMENTS

| | | | |
|---|---|---|---|
| 3,141,168 | 7/1964 | Ashton | 343/765 |
| 3,153,789 | 10/1964 | Ashton | 343/765 |
| 3,239,839 | 3/1966 | Banche et al. | 343/765 |
| 3,412,404 | 11/1968 | Berghing | 343/765 |
| 3,860,931 | 1/1975 | Pope et al. | 343/765 |
| 4,171,876 | 10/1979 | Wood | 350/292 |
| 4,264,145 | 4/1981 | Urruela | 350/299 |
| 4,297,003 | 10/1981 | Hutchison | 350/292 |

Primary Examiner—Jon W. Henry
Attorney, Agent, or Firm—Cole, Jensen & Puntigam

[57] ABSTRACT

A support system for a solar concentrator (10), the support system capable of rotating the solar concentrator (10) in both a horizontal, or azimuth plane, and in a vertical, or altitude, plane. The support system includes a footing (12) to which a spindle (14) is anchored. A central mast (22) is rotatably positioned on the spindle (14). A bearing (40) is positioned near the top of the mast (22). A drive wheel (24) is secured to the mast (22) near the bottom thereof and rotates therewith. A motor (36) is used to rotate the drive wheel (24), and hence the central mast, in the horizontal plane. A system of counterweights (42, 43) and struts (46, 47, 48, 54, 55 and 56 for one counterweight 42 as an example) which connects the bearing (40) and the solar concentrator (10) permits rotation of the solar concentrator in the vertical plane. The counterweight and strut system is arranged such that the solar concentrator passes over the top of the mast (22) and beyond while the counterweights (42, 43) pass on opposite sides of the mast (22).

10 Claims, 7 Drawing Figures

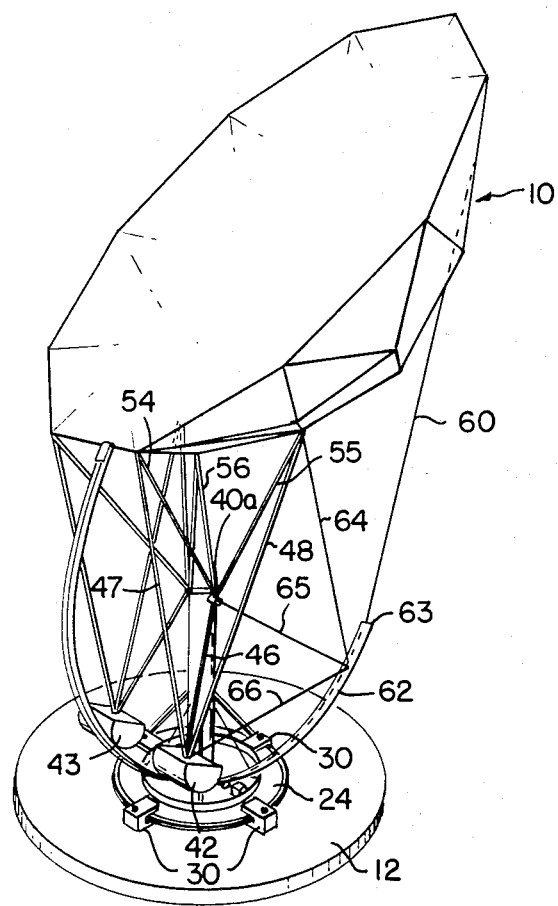
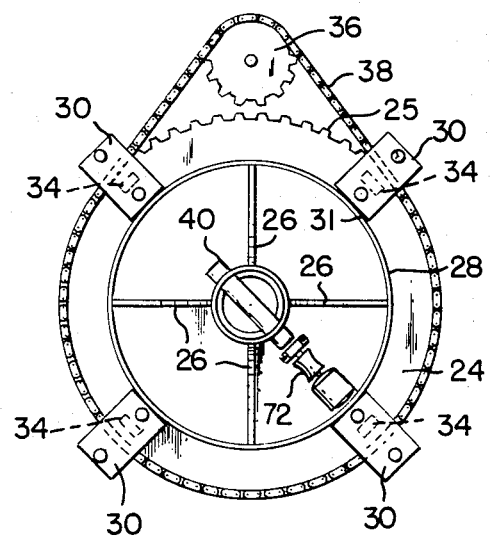
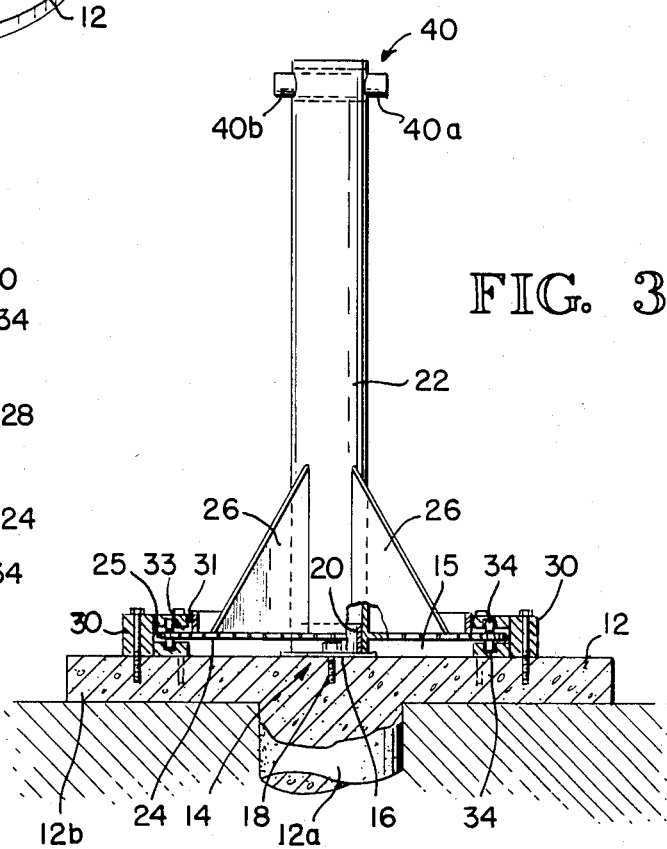
FIG. 1
FIG. 3
FIG. 2

SUPPORT CARRIAGE FOR A SOLAR CONCENTRATOR

DESCRIPTION

1. Technical Field

This invention relates generally to the art of support systems for solar concentrators, and more particularly concerns such a system which includes a single support mast with counterweights and connecting struts, wherein the concentrator may be rotated both in a horizontal plane (azimuth direction) and a vertical plane (altitude direction) to accurately track the sun from a stowed position upside down adjacent the ground.

2. Background Art

A solar concentrator is an apparatus which includes a reflective surface which focuses the impinging rays of the sun to a particular point. At the point focus of the concentrator is typically a boiler or similar apparatus for producing steam, which in turn can be used directly to provide heat, or converted into electrical power. Solar concentrators known in the art have many configurations and sizes. The reflective surface of the concentrator may be in the form of a single piece paraboloidal mirror, or may have the general shape of a paraboloid but comprise individual reflecting elements or facets arranged to approximate a paraboloidal surface. In another embodiment, the facets are arranged in a linear configuration. Fresnel mirror technology has also been used for solar concentrators. All of the above configurations, however, do produce a point focus of the sun's rays from their reflective surfaces; hence, they are collectively referred to as point focus solar concentrators. A good summary of the state of the art of point focus solar concentrators is in a document entitled Dish Concentrators For Solar Thermal Energy: Status and Technology Development, by L. D. Jaffe, which is available from the Department of Energy, document No. DOE/JPL-1060-48, and from the Jet Propulsion Laboratory, document No. 81-43.

Point focus solar concentrators require a support system to enable the concentrator to track the sun. The support system must be strong enough to control a large concentrator, which can range up to 40 feet in diameter, and designed so that the concentrator is capable of rotation both in a horizontal plane (azimuth tracking) and in a vertical plane (altitude tracking).

Most known support systems include rather elaborate arrangements for supporting the rim of the concentrator. Such systems can be seen in the DOE/JPL publication noted above. U.S. Pat. No. 2,960,693 to Fry, U.S. Pat. No. 2,877,459 to Brown, and U.S. Pat. No. 4,167,740 to Schriver are examples of conventional support structures for large antenna structures. Applicant is also aware of U.S. Pat. No. 1,971,757 to Narem for a light support, but it is doubtful whether that teaching is analagous to the technical field of the present invention. The antenna support systems in particular, however, are expensive, complex, and require heavy equipment to construct and then secure to the concentrator.

A support system for a solar concentrator must also, however, be capable of withstanding the environmental conditions in which the concentrator is used. This is very important to the practical use of solar concentrators. The most significant environmental danger to solar concentrators is heavy wind loads, and the debris and dirt carried by heavy winds. Hail can also be a significant problem. The concentrator and the support system in particular must be designed to withstand those particular conditions, as well as other environmental conditions such as rain, snow, temperature extremes and others peculiar to a given site.

Generally, the wind load problem can be solved by either protecting the concentrator itself, which adds significant expense, complexity and weight to the concentrator, or the support system is designed so that it can move the concentrator into a stowed or protected position which is not particularly vulnerable to such environmental conditions. The art has, however, generally taught that a system for stowing the concentrator has significant disadvantages. For instance, if the dish is faced straight up during heavy wind to minimize horizontal wind drag, the reflective surface is still vulnerable to hail and wind blown debris. Such an arrangement would require heavy support system anchoring to withstand the uplift forces of severe wind conditions. Facing the dish straight down, at ground level, would also minimize the horizontal wind drag but would also protect the reflective surface. The effect of any uplift wind forces would be minimized and the concentrator would further have a relatively low wind profile in that position, thereby reducing the anchoring requirements of the support structure.

However, a practical support system implementing such an approach has heretofore not been known, to the best of applicant's knowledge. Such a support system has heretofore been thought to be extremely expensive, as well as unstable in sudden winds. Thus, the direction of the art has been to shield the concentrator itself against the effect of heavy winds.

Accordingly, it is a general object of the present invention to overcome one or more of the disadvantages of the prior art noted above with the support system disclosed hereinafter.

It is another object of the present invention that such a support system be capable of tracking the sun both in the azimuth and altitude directions.

It is a further object of the present invention that such a support system be capable of stowing the solar concentrator in a face down position near the ground.

It is an additional object of the present invention that such a support system not require significant ground preparation for its installation, so that it may be constructed in remote areas.

It is a still further object of the present invention that such a support system can be connected to the solar concentrator when the concentrator is on the ground, without the use of heavy construction equipment, such as cranes.

It is yet another object of the present invention that such a support system be resistant to heavy and/or sudden wind loads.

It is an additional object of the present invention that such a support system be relatively simple in construction and operation, without a complicated gear reduction system.

DISCLOSURE OF THE INVENTION

Accordingly, the present invention includes a support mast which has a bearing near the top thereof. The invention also includes first and second counterweights and a system of struts which connect the two counterweights, respectively, to the bearing on the support mast and to the solar concentrator itself. The strut means are arranged into a particular pattern such that the counterweights are free to pass on opposite sides of the support mast as the solar concentrator is rotated in a vertical plane above the top of the support mast and beyond. Means are provided for rotating the first and second counterweights and the strut system, and hence the solar concentrator, in the vertical plane, and means also are provided for rotating the support mast, and hence the solar concentrator, in a horizontal plane.

BRIEF DESCRIPTION OF THE DRAWINGS

FIG. 1 is a schematic diagram showing the support system of the present invention connected to a solar dish concentrator.

FIG. 2 is a top plan view of the support system shown in FIG. 1.

FIG. 3 is an elevational view of the support system shown in FIG. 1.

BEST MODE FOR CARRYING OUT THE INVENTION

Figure 4:
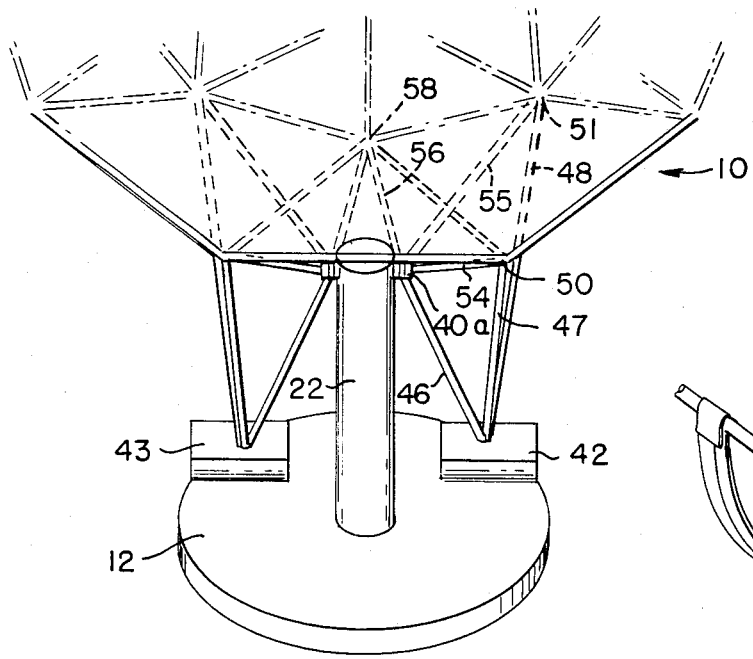
FIG. 4 is an elevational view showing in particular the strut and counterweight portions of the support system shown in FIG. 1.
Figure 5:
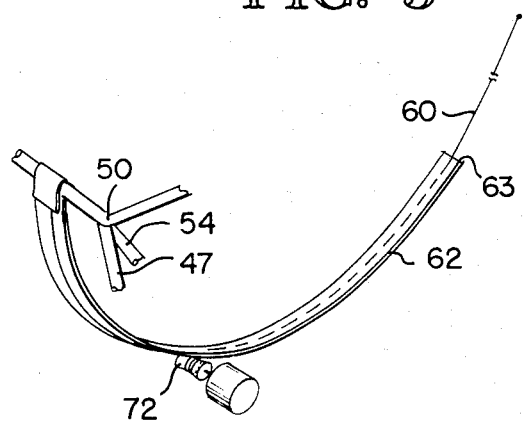
FIG. 5 is a schematic view showing a portion of the support system of the present invention for rotating the solar concentrator in the vertical direction.

Referring to FIG. 1, the present invention is a support system for a solar dish concentrator, the support system providing a sun tracking capability for the concentrator, both in the azimuth direction, i.e. a horizontal plane, and in the altitude direction, i.e. a vertical plane. The support system of FIG. 1 is designed and constructed so that in the altitude direction, the concentrator is moved between a stowed position in which the concentrator is face down adjacent the ground surface, and an operative position, in which the concentrator is in an upright position, with its apperature and hence its reflective surface, of glass or other material, open in the direction of the sun.

FIG. 1 shows the principal components of the support system of the present invention in relation to a dish concentrator 10 which is shown in an upright position. FIGS. 1, 2 and 3 show a footing 12 which forms the base of the support system. Footing 12 is shown generally T-shaped, with a deep central core portion 12a and a relatively thin top portion 12b. The size of footing 12 will vary, depending both upon the size of the concentrator which it supports, and the ground conditions in which the footing is located. Generally, the larger the concentrator and/or the looser or less stable the ground condition, the larger will be the size and thickness of the footing. In swampy or sandy ground, for instance, footing 12 will be larger in diameter and have a greater thickness than otherwise, while in very hard conditions such as rock, the size and thickness can be decreased. As an example, for a 30 foot diameter concentrator and average soil conditions, the top portion 12a of footing 12 will be slightly greater than 6 feet in diameter, with a central core approximately 16 inches in diameter, extending down to a depth of 6 feet, and a top section approximately 12 inches thick. The footing 12 in the embodiment shown is concrete, reinforced by conventional means, such as iron bars, and will typically be constructed on site.

Anchored to the top center of footing 12 is a central spindle or thrust bearing 14. Spindle 14 includes a steel plane 16, approximately 14 inches in diameter and $\frac{1}{2}$ inch thick, which is anchored to the top surface 15 of footing 12 by an anchor bolt 18, which is a steel bolt, approximately $\frac{3}{4}$ inch in diameter and approximately 24 inches long. A circular steel flange 20 is welded to the top surface of plane 16. Flange 20 is L-shaped in crossection and extends upwardly approximately 12 inches from plate 16. The relative dimensions of the vertical and horizontal (lip) portions, respectively, of the circular flange, including the outside diameter of the vertical portion, are such as to permit a central mast 22 to fit flush over the flange 20.

In the embodiment shown, mast 22 is a 10 foot length of steel pipe, 12 inches in diameter. The lower portion of its interior surface fits flush with the exterior surface of the vertical portion of flange 20. Its lower edge rests against the upper surface of the horizontal (lip) portion of flange 20, and its exterior surface is in the same vertical plane as the outer edge of the horizontal lip portion of flange 20. Flange 20 provides lateral support for mast 22, and the two parts are respectively designed so that mast 22 is rotatable relative to flange 20.

Extending radially outward from central mast 22 near or at the lower edge thereof is a sprocket wheel 24, which in the embodiment shown is constructed of steel, and is approximately 4 feet in diameter and $\frac{1}{2}$ inch thick. Sprocket wheel 24 is welded to the central mast 22, so that the sprocket wheel and the central mast rotate as a unit above flange 20.

Sprocket wheel 24 is reinforced by four fins 26 and a stiffening ring 28. Stiffening ring 28 is a ring of steel welded to the top surface of sprocket wheel 24. It has a diameter of approximately 3 feet, is 4 inches high, and $\frac{1}{2}$ inch thick. The four vertical fins 26 are steel plates approximately $\frac{1}{2}$ inch thick and triangular in configuration. They are positioned vertically at equally spaced intervals around the sprocket wheel. The vertical edge is welded to the central mast 22 and an adjacent edge to the top surface of sprocket wheel 24. In the embodiment shown, the fins 26 extend up the central mast approximately 3 feet and extend out to the stiffening ring 28. The combination of fins 26 and stiffening ring 28 provide the required strength for the sprocket wheel and central mast, with a minimum of additional bulk and weight.

Supporting the outer rim 25 of sprocket wheel 24 are four elements referred to as tie-down rollers 30, which are located at equally spaced intervals (90° apart) around the periphery of sprocket wheel 24. Each tie-down roller 30 includes a steel box housing comprised of $\frac{3}{4}$ inch steel plate secured by anchor bolts to the footing 12. Each box is rectangular in configuration, approximately 8 inches high by 4 inches wide by 8 inches long. Approximately midheight of the housing along inner edge 31 is a horizontal slot 33, which extends part-way of the width of the housing. Approximately 6 inches of the edge portion of sprocket wheel 24 extends into slot 33. Two steel rollers 34, approximately 3 inches in diameter, are mounted for rotation in a vertical plane within the housing, above and below the slot 33. The rollers are mounted so that they contact the upper and lower surfaces of sprocket wheel 24, approximately 3 inches from the outer rim thereof. The four tie-down roller elements 30 thus securely support the rim of sprocket wheel 24 and provide stability therefor, if necessary. In certain instances, the tie-down rollers may not be necessary.

Sprocket wheel 24 is driven by a motor 36 which in the embodiment shown is also mounted to footing 12, at a point outside the rim of sprocket wheel 24. Motor 36 is a one quarter horsepower, reversible motor geared down to approximately 1600 to 1. Motor 36 drives sprocket wheel 24 through a chain 38, which mates with the conventional sprocket on the outer rim of the sprocket wheel. The revolution of sprocket wheel 24 in a horizontal plane by motor 36 results in a rotation of central mast 22 about flange 20, and hence a rotation of the solar dish concentrator 10 in the azimuth (horizontal) direction. The structure shown is capable of providing 360° of freedom in the azimuth direction.

Near the top of central mast is a 6" diameter steel altitude bearing 40, which extends horizontally through mast 22 and is supported by a bearing sleeve therein. Altitude bearing 40 extends approximately 6 inches to either side of mast 22. Thus, bearing 40 has two connection points 40a and 40b on either side of the mast.

Bearing 40 is the pivot point for the strut and counterweight portion of the system. There are two counterweights 42 and 43 in the embodiment shown. Each counterweight is a truncated cylinder, approximately 2 feet in diameter by 3 feet long, and weights approximately 3,000 pounds, for a concentrator weighing 4,500 pounds. A system of struts connects the counterweights both to bearing 40 and to dish concentrator 10. For purposes of illustration, and description, only one-half of the strut system, with one counterweight, will be described with particularity. The other half of the strut system, with the other counterweight, is the mirror image of the half which shall be described.

Referring to FIGS. 1 and 3, a series of three counterweight struts 46, 47 and 48 originate from an approximately common point in counterweight 42. The counterweight struts, and the other struts in the support system, are, in the embodiment shown, lengths of 4 inch aluminum tubing, having a 0.072 inch wall thickness. Counterweight struts 46, 47 and 48 form a first tripod connection, from a counterweight apex to a bearing and concentrator base. Counterweight strut 46 extends between counterweight 42 and one connection side 40a of bearing 40, while counterweight struts 47 and 48 extend between counterweight 42 and two spaced points on dish concentrator 10.

Dish concentrator 10 is shown herein as comprising a framework of triangles arranged in a pentagonal pattern, as clearly shown in FIG. 3. The connections between the strut system portion of the present invention and dish concentrator 10 are described for such a pentagonal concentrator framework. However, it should be understood that the present invention is not limited to such a dish concentrator configuration.

Counterweight struts 47 and 48 are each secured to apex points of one pentagon in the concentrator framework, with counterweight strut 47 being attached to a first apex point 50 on the rim of the concentrator, while counterweight strut 48 is attached to an adjacent apex point 51 inward of the rim.

Another series of three struts 54, 55 and 56 extend between the one connection side 40a of bearing 40 and three points on dish concentrator 10. Bearing struts 54, 55 and 56 thus form a second tripod connection, from a bearing 40 apex to a base of three point on the dish concentrator. The first bearing strut 54 extends between bearing 40 and the first apex point 50 on the dish concentrator; the second bearing strut 55 extends between bearing 40 and the second apex point 51. The third bearing strut 56 extends between bearing 40 and the center point 58 of the same pentagon that includes apex points 50 and 51.

The counterweight struts and the bearing struts are arranged so that counterweight 42 moves through a path which comes quite close to but does not contact mast 22, as the dish concentrator is rotated in a vertical plane. With the structure shown, the near surface of the counterweight 42 comes within approximately 6 inches of mast 22. An identical counterweight and strut arrangement uses connection side 40b on the opposite side of mast 22. Those struts are connected to the other two apex points and center of the pentagon.

In operation with such a system, the central mast 22 is positioned between the dish concentrator 10 and the counterweight when the dish concentrator is relatively near the ground. As the concentrator is rotated to a vertical position over the top of the mast and beyond, the two counterweights rotate downwardly and pass on opposite sides of the mast. There are no struts connecting the counterweights or other struts to block the free rotation of the concentrator.

As noted above, such a support system can be used with other concentrator configurations. The strut connections on the concentrator must be located appropriately, however, so as to provide the proper clearance for the counterweights and proper support for the concentrator relative to central mast 22.

The portion of the support system for moving the concentrator in a vertical direction, i.e. the altitude direction, is shown in FIGS. 1 and 5, 6 and 7. This portion includes a flexible cable 60 and a curved, fixed steel track 62 in which the cable rides for a portion of its length. The fixed track 62 is curved, somewhat longer than a hemisphere, extending for approximately 205° in the embodiment shown, sufficient to provide full sun tracking. One end of fixed track 62 is attached to the rim of concentrator, approximately at apex point 50. Fixed track 62 curves first outwardly from concentrator 10 and then back towards the concentrator 10, terminating in a free end 63. It is supported near or at its free end 63 relative to the concentrator, in the embodiment shown. Three free-end struts 64, 65 and 66 form a tripod connection between the steel track, which is the tripod apex, and points on the dish concentrator, the counterweight and the bearing, which comprise the tripod base. The first strut 64 extends between the steel track 62 and apex point 51 on the dish concentrator, to which point a counterweight strut and a bearing strut are also connected. The second free end strut 65 extends between the track and connection side 40a of bearing 40. The third free-end strut 66 extends between the track and the counterweight 42. If necessary, another tripod connection could be used at the midpoint of the steel track 62.

The cable 60, which in the embodiment shown is one-half inch braided steel cable, is also secured to the rim of the concentrator approximately at the point 50 where the one end of the iron track is secured. Cable 60 then extends away from the rim, in track 62, for a short distance and then is wound around an endless winch 72. The cable then proceeds back to the track over the rest of the length of the track and then extends beyond the free end of the track to the other side of the concentrator, i.e. the other end 74 of cable 60 is connected to the rim of the concentrator at a point 180° from its first connection point 50. In operation, the winch 72 will wind the cable 60, creating a tension on the cable, thus moving the concentrator in the vertical plane.

Such a system is capable of moving the concentrator 10 from a face-down position adjacent the ground into an upright position to the point where the dish concentrator is facing straight up. In this position, or in any other vertical position, the dish concentrator can be rotated in the azimuth direction by operating the motor 36. If the concentrator is rotated horizontally 180° when it is in a face-up position, the concentrator can thereafter be lowered again to a face-down position which is 180° removed from its original face-down position. Hence, the present system permits convenient movement of the dish from horizon to horizon with a face-down capability at both positions.

Figure 6:
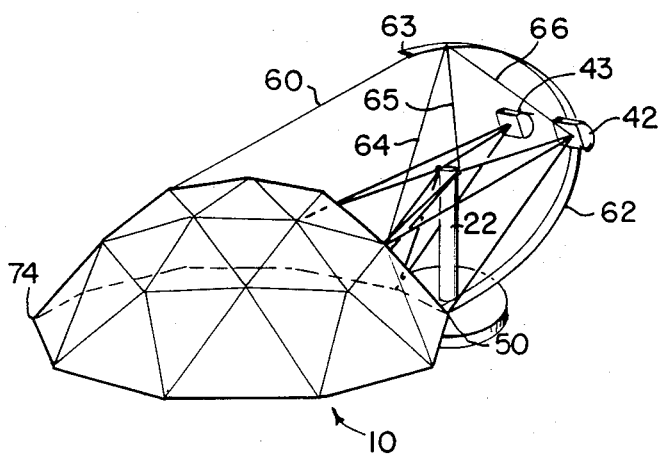
FIG. 6 is a schematic view showing the system of FIG. 1 with the solar concentrator in a stowed position.

FIG. 6 shows the dish concentrator 10 in a face-down position substantially adjacent the ground surface. In this position, the counterweights 42, 43 are slightly above the top of the dish concentrator, with the vertical central mast 22 between the concentrator and the counterweights. With such a system, the concentrator may be assembled on the ground, face down, and then attached to the struts of the support system, typically without the need for heavy equipment, such as cranes. Such a system thus is useful in remote locations or difficult terrain. In the face-down or stowed position of FIG. 6, the reflective surface of the concentrator is protected against high wind loads, and against hail and wind-blown debris. A protective covering will typically be provided over the rear side of the concentrator.

Figure 7:
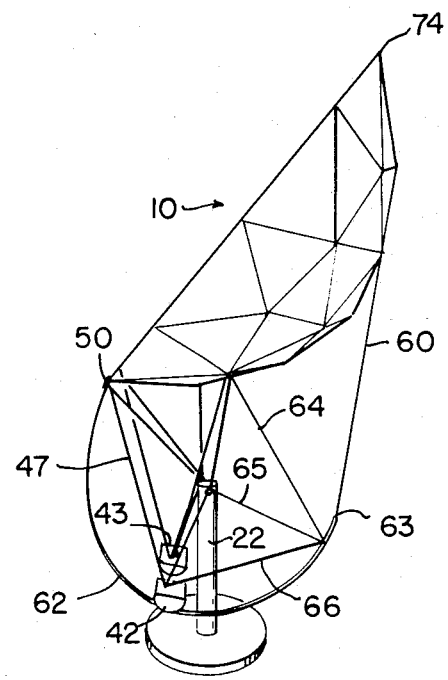
FIG. 7 is a schematic view showing the system of FIG. 1 with the solar concentrator in an upright, operative position.

FIG. 7 shows the concentrator 10 in an upright position, at a specified angle. In this position, the counterweights are rotated to a point near the ground, close to the central mast. As the concentrator is rotated vertically, tracking the sun in an altitude direction, the counterweights pass around the central mast. Such an arrangement, with a horizontal rotation, as noted above, permits the tracking of the sun from horizon to horizon.

Thus, a support system for a solar concentrator has been described which is capable of moving a concentrator in the altitude direction between a stowed position where it is protected against heavy wind loading to a selected operative position. The support system is simple in operation and can be constructed on site. It is not particularly expensive nor complex and provides the required amount of freedom of movement, both in the azimuth and altitude directions.

Although a preferred embodiment of the invention has been disclosed herein for illustration, it should be understood that various changes, modifications and substitutions may be incorporated in such embodiment without departing from the spirit of the invention as defined by the claims which follow.

I claim:

1. A support system for a solar concentrator, comprising:
    concentrator support means, having a bearing means mounted thereon;
    means for turning said support means in a horizontal plane;
    counterweight means;
    strut means connecting said counterweight means, said bearing means and the solar concentrator in such a manner that the solar concentrator can be rotated in a vertical plane to a stowed position face down on the ground, wherein the support system is so arranged that said concentrator support means is outside the rim of the solar concentrator when the solar concentrator is in its stowed position; and
    means for rotating the solar concentrator in a vertical plane, including a track means which extends outwardly in a curve to the rear of the solar concentrator from a point approximately on the rim of the solar concentrator, means supporting said track means relative to the solar concentrator, line means which is connected at one end thereof to the solar concentrator, which extends along said track means, and which is connected at the other end thereof to the solar concentrator again, and means operating on said line means for raising and lowering said solar concentrator between a stowed position face down on the ground and a raised upright operative position.

2. An apparatus of claim 1, wherein said support means is a single vertical support mast, and wherein said bearing means is a horizontal bearing means which extends outwardly from the support mast a relatively short distance compared to the height of the mast.

3. An apparatus of claim 2, wherein said track means is a partial circle, having a diameter approximately at least half as great as the diameter of the solar concentrator.

4. An apparatus of claim 3, wherein said track means terminates at a free end, and wherein said line means extends beyond the free end of the track means and is secured to the rear of the solar concentrator, and wherein said means operating on said line means is an endless winch.

5. An apparatus of claim 2, wherein said counterweight means includes first and second counterweights and wherein said strut means includes two sets of struts, one for each counterweight, wherein said track support means includes additional strut means connecting the track means at several points to the rear of the solar concentrator and to the bearing means, and wherein said strut means, said first and second counterweights and said support mast are arranged so that said first and second counterweights pass on opposite sides of said support mast as the solar concentrator is rotated in a vertical plane above the top of said support mast and beyond.

6. The apparatus of claim 1, wherein said strut means and said counterweight means are arranged so that the solar concentrator can be moved in the vertical plane from a first face-down position adjacent the ground to a face-up position above said support mast, rotated 180° in the horizontal plane, and then lowered into a second face-down position adjacent the ground approximately 180° from the first face-down position.

7. The apparatus of claim 2, wherein said support mast is positioned between the solar concentrator and said counterweight means when the solar concentrator is in a face-down position adjacent the ground, and wherein said counterweight means and said strut means are so arranged that said counterweight means pass within a small distance, compared with the height of the support mast, of said support mast as the solar concentrator is rotated in the vertical plane above the top of said support mast and beyond.

8. The apparatus of claim 2, wherein said means for turning said support mast in the horizontal plane includes a support footing, a spindle anchored in said support footing upon which said support mast is rotatably positioned, a horizontal drive wheel secured to said support mast near the bottom thereof, and means for rotating said drive wheel and hence said support mast.

9. The apparatus of claim 8, including means positioned on said support footing at spaced intervals around the rim of said drive wheel for stabilizing the rim of said drive wheel.

10. The apparatus of claim 2, wherein said bearing means is an elongated rod-like element, mounted on said system support means such that its longitudinal axis is horizontal and such that it is free to turn about its longitudinal axis, and wherein said counterweight means are positioned axially away from said bearing means by said strut means at substantially the opposite ends of said bearing means.

* * * * *